W. D. PATTON.
CRUDE OIL BURNER.
APPLICATION FILED NOV. 11, 1909.

972,401.

Patented Oct. 11, 1910.

WITNESSES:
C. S. Knight.
J. H. Murray

INVENTOR
William. D. Patton.
BY John M. Spellman
ATTORNEY

UNITED STATES PATENT OFFICE.

WILLIAM D. PATTON, OF DALLAS, TEXAS.

CRUDE-OIL BURNER.

972,401.  Specification of Letters Patent.  Patented Oct. 11, 1910.

Application filed November 11, 1909. Serial No. 527,360.

*To all whom it may concern:*

Be it known that I, WILLIAM D. PATTON, a citizen of the United States, residing at Dallas, in the county of Dallas and State of Texas, have invented certain new and useful Improvements in Crude-Oil Burners, of which the following is a specification.

My invention relates to new and useful improvements in crude oil burners. Its object is to provide a crude oil burner especially adapted for use in ordinary stoves for heating rooms.

A further object is to provide a crude oil burner in which the oil is highly heated before ignition causing it to readily vaporize when burning.

Finally, the object of the invention is to provide a device of the character described, that will be strong, durable, simple and efficient, and comparatively easy to construct, and also one in which the various parts will not be likely to get out of working order.

Figure 1:
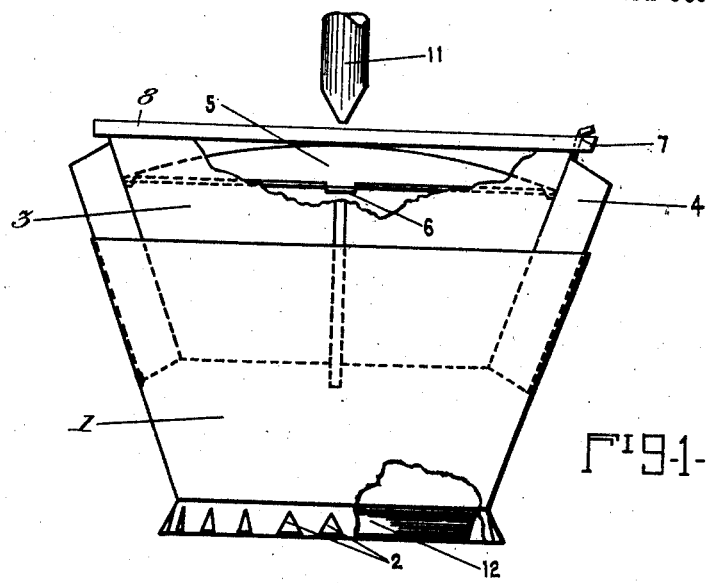
Figure 2:
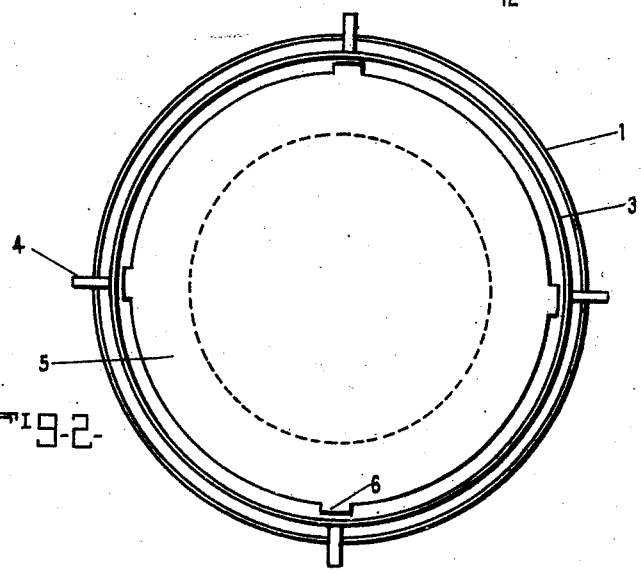
Figure 3:
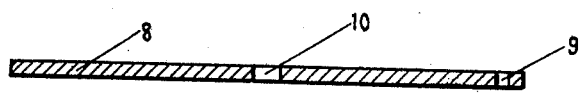

With these and various other objects in view my invention has relation to certain novel features of construction and operation, an example of which is described in the following specification, and illustrated in the accompanying drawing, wherein:

Figure 1 is a side elevation of the burner, showing a portion of the oil supply pipe, and a portion of the side walls being broken away to show the interior construction. Fig. 2 is a top view of the burner, the lid being omitted. Fig. 3 is a sectional view taken through the center of the lid.

Referring now more particularly to the drawings, wherein like numerals of reference designate similar parts in all the figures, the numeral 1 denotes a funnel shaped vessel adapted to be set in the fire box of a stove. A number of apertures 2 provided at the base of this vessel permit the entrance of air, to furnish draft to the burner. A similarly shaped vessel 3 of smaller size is maintained centrally within the upper portion of the vessel by a number of vanes 4, resting upon the inner surface of the first named vessel. A drip plate 5 having an inverted dish shape is positioned in the upper portion of the vessel 3, being there retained by a number of projecting lugs 6 upon its edge, which rest upon the inclined inner surface of the vessel 3. A slight projection or knob 7 is fixed at the edge of the vessel 3 as a pivot for the lid 8, which lid is provided with an aperture 9 to receive said knob. A central aperture 10 is also provided in the lid to permit the oil to drip therethrough from the feed pipe 11.

To start the burner, a small quantity of oil is admitted to a pan 12, positioned in the base of the burner, and is there ignited. When the burner has become thoroughly heated, oil is admitted to the feed pipe, from which it drips centrally upon the spherical plate 5. It is thus caused to spread upon the plate in all directions and if the quantity be small, will be vaporized by the heat of said plate, combustion taking place at the edges thereof. To secure a greater degree of heat, however, sufficient oil will be admitted to cause a portion of it to drip upon the inner surface of the vessel 3, combustion taking place at the lower edge of said vessel. The flame, receiving its draft through the apertures 2, will pass up between the walls of the vessels 1 and 3, keeping the oil upon the inner surface of the latter highly heated so as to readily vaporize and ignite. In case oil should be admitted too rapidly to the burner the surplus will drip into the pan 12.

I am aware that changes may be made in the form and proportion of parts and details of construction of the device herein described as a preferable embodiment of my invention without departing from the spirit or sacrificing the advantage thereof, and I therefore reserve the right to make such changes and alterations in said device as fairly come within the scope of the following claims.

What I claim is:

1. A crude oil burner consisting of an outer funnel shaped vessel, an inner funnel shaped vessel centrally supported within the first named vessel, an air space being provided between the two, a drip plate having an inverted dish shape centrally supported within the inner vessel at some distance from the walls thereof, an oil feed pipe adapted to discharge centrally upon said drip plate, and a pan positioned in the base of the burner.

2. A crude oil burner, consisting of a funnel shaped vessel having draft inlets in its base, a second funnel shaped vessel centrally supported within the upper portion of the first named vessel, a drip plate having an inverted dish shape centrally positioned in the upper portion of the inner vessel at a distance from its walls, an oil feed pipe adapted to discharge centrally upon the drip plate, a drip pan positioned in the base of the burner, and a pivoted lid adapted to cover the top of the inner funnel shaped vessel.

3. A crude oil burner consisting of a funnel shaped vessel having draft apertures in its base, a second funnel shaped vessel centrally supported within said vessel, vanes projecting rigidly from the walls of the inner vessel and resting upon the walls of the outer vessel, a drip pan positioned in the base of the burner, means by which the oil may be distributed evenly upon the walls of the inner vessel, and an oil feed pipe communicating with the last named means.

In testimony whereof I have signed my name to this specification in the presence of two subscribing witnesses.

WILLIAM D. PATTON.

Witnesses:
G. B. CORDSON,
J. S. MURRAY.